United States Patent
Grotendiek et al.

(10) Patent No.: US 6,917,866 B2
(45) Date of Patent: Jul. 12, 2005

(54) METHOD FOR SENSING SIDE IMPACTS IN A VEHICLE

(75) Inventors: Torsten Grotendiek, Bietigheim-Bissingen (DE); Michael Roelleke, Leonberg (DE); Pascal Kocher, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/470,293

(22) PCT Filed: Dec. 14, 2001

(86) PCT No.: PCT/DE01/04761

§ 371 (c)(1),
(2), (4) Date: Jan. 13, 2004

(87) PCT Pub. No.: WO02/058968

PCT Pub. Date: Aug. 1, 2002

(65) Prior Publication Data

US 2004/0117089 A1 Jun. 17, 2004

(30) Foreign Application Priority Data

Jan. 27, 2001 (DE) .......................... 101 03 661

(51) Int. Cl.$^7$ ................................ G06F 7/00
(52) U.S. Cl. ........................ 701/45; 180/268
(58) Field of Search ............... 701/36, 45–47; 180/268, 271, 282; 280/728.1, 735

(56) References Cited

U.S. PATENT DOCUMENTS

| | | | | |
|---|---|---|---|---|
| 5,608,628 A | * | 3/1997 | Drexler et al. | 701/45 |
| 6,236,308 B1 | * | 5/2001 | Dalum | 340/436 |
| 6,584,386 B2 | * | 6/2003 | Feser et al. | 701/45 |

FOREIGN PATENT DOCUMENTS

| | | |
|---|---|---|
| DE | 39 24 507 | 8/1990 |
| DE | 198 06 836 | 9/1999 |
| DE | 101 08 849 | 10/2001 |
| WO | 02 14113 | 2/2002 |

* cited by examiner

Primary Examiner—Thu V. Nguyen
(74) Attorney, Agent, or Firm—Kenyon & Kenyon

(57) ABSTRACT

In a method for side impact sensing in a vehicle, a side impact is recognized using acceleration signals, the acceleration signals from the left and right sides of the vehicle being subtracted from one another, integrated or added up, and the triggering threshold is formed as a function of this differential acceleration signal. If the integrated differential acceleration signal exceeds this threshold, a side impact is recognized.

2 Claims, 1 Drawing Sheet

METHOD FOR SENSING SIDE IMPACTS IN A VEHICLE

FIELD OF THE INVENTION

The present invention is directed to a method FOR side impact sensing in a vehicle.

BACKGROUND INFORMATION

Acceleration measurements are used for side impact sensing, decentralized peripheral acceleration sensors (PAS) in particular. They are mounted in the physical proximity of the impact site to compensate for signal delays and signal attenuation. Typical installation sites include the rocker panel, the seat cross member, or the B pillar.

SUMMARY OF THE INVENTION

The side impact sensing method in a vehicle according to the present invention has the advantage over the related art that the acceleration signals from the left and right sides of the vehicle are intelligently combined by the control unit. Thus only one signal is processed to detect a side impact, so that the computing complexity for two signals becomes superfluous. Vehicle vibrations which occur in the event of hard driving maneuvers, known as misuse, contain no side motion components, which increases the difference from the triggering signals. In this case, the effect of the vehicle motion in the event of a side impact is utilized in particular. The side motion is detectable by all y acceleration sensors, i.e., sensors which detect side motion, and is superimposed on the corresponding side due to the intrusion in the event of a side impact. The motion of the vehicle and a filtered intrusion signal are visible on the opposite side and in the control unit. Thus, triggering reliability vis-a-vis non-triggering events is increased by combining the signals.

It is particularly advantageous that the differential acceleration signal is filtered prior to forming the threshold in order to avoid in particular signals that would cause triggering in a non-triggering situation, i.e., in the event of misuse.

Finally, it is also advantageous that a device for side impact sensing, which has appropriate acceleration sensors and the control unit, is provided to implement the method.

DETAILED DESCRIPTION

Side impact sensing is particularly critical due to the short deformation zone between the occupants and the impacting object in the event of a side impact; yet, it is important that erroneous triggering be avoided in this case.

Side impact situations are recognized according to the present invention by acceleration sensors, the acceleration signals from the acceleration sensors on the left and right sides of the vehicle being subtracted from one another to form a differential acceleration signal. A differential speed signal is determined from the differential acceleration signal by integration, and the triggering threshold is formed as a function of the differential acceleration signal. If the differential speed signal exceeds the threshold, a side impact is recognized, and restraining means may possibly be deployed; if it is below the threshold, no side impact requiring deployment of restraining means exists.

Figure 1:
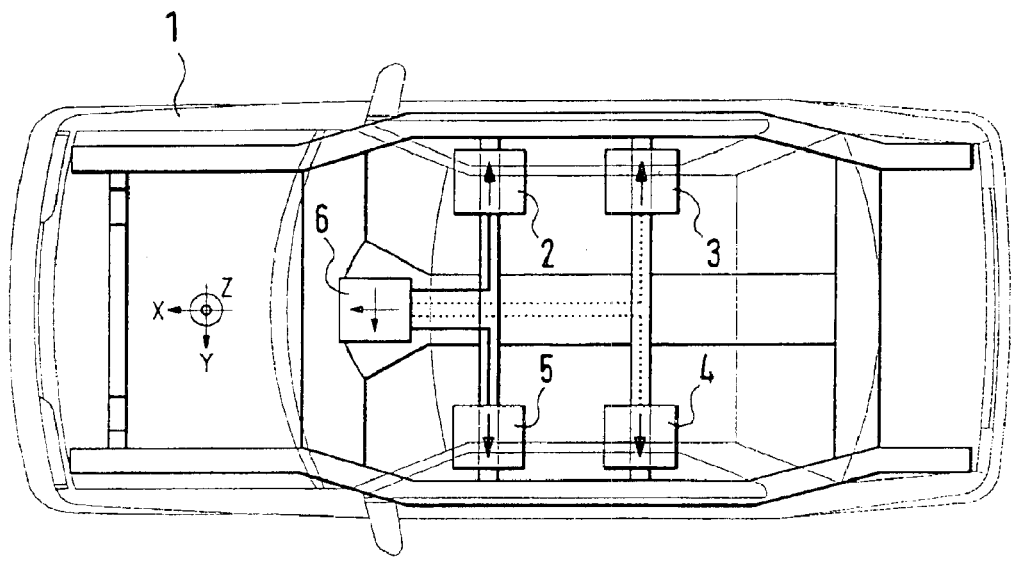
FIG. 1 shows a top view of the device according to the present invention.

FIG. 1 schematically shows a top view of the device according to the present invention in a vehicle. A vehicle 1 has peripheral acceleration sensors 2 and 3 on the right side. Front sensor 2 is installed on the seat cross member in this case. The rocker panel and the B pillar are additional installation sites. Rear sensor 3 is mounted on the C pillar. The rocker panel and seat cross member are additional installation sites. Sensors 2 and 3 are connected to data inputs and outputs of a control unit 6. Sensors 4 and 5, which are also acceleration sensors and are located on the left side of the vehicle being mounted symmetrically on the seat cross member and on the C pillar, are connected to control unit 6 via data inputs and outputs, for example via a bus. Conventional two-wire lines are, however, also conceivable.

The acceleration signals are transmitted by acceleration sensors 2 through 5 to control unit 6 as digital data. For this purpose, each of sensors 2 through 5 has a measuring amplifier, a measuring filtering device, and an analog/digital converter. As an alternative, the analog/digital conversion may also take place in control unit 6, for example; electromagnetic interference signals must be taken into account in this case.

Control unit 6 computes the triggering algorithm as a function of the signals of acceleration sensors 2 through 5. In addition, control unit 6 itself has acceleration sensors for the x and y directions to lest the acceleration signals from the peripheral acceleration sensors for plausibility.

Figure 2:
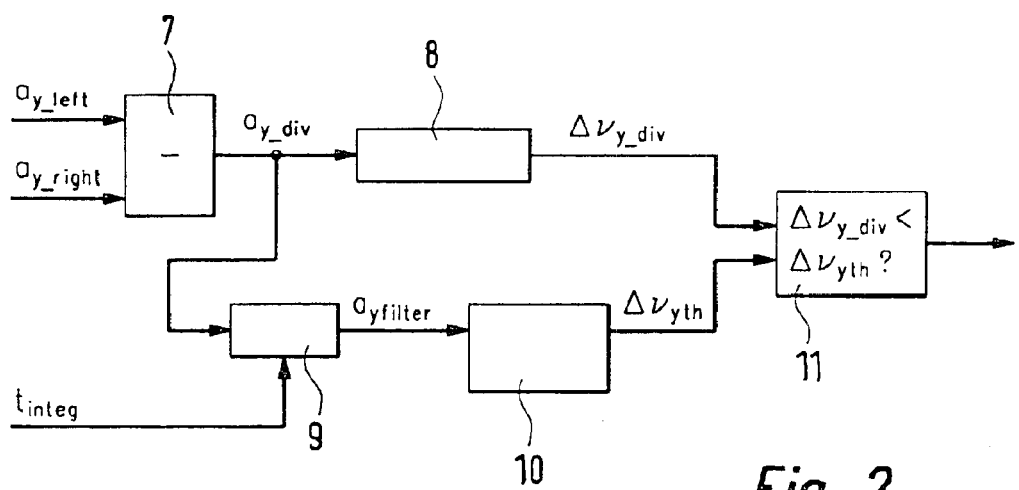
FIG. 2 shows a block diagram which illustrates the method according to the present invention.

FIG. 2 describes this triggering algorithm. Two acceleration signals $a_{yleft}$ and $a_{yright}$ are subtracted from one another in block 7, yielding acceleration signal $a_{ydiv}$. This differential acceleration signal $a_{ydiv}$ is integrated in block 8 to generate differential speed signal $\Delta v_{ydiv}$ and is also filtered in block 9 to generate filtered signal $a_{yfilter}$. Filtering in block 9 is performed as a function of an integration time $t_{integ}$. The threshold with which differential acceleration signal $\Delta v_{ydiv}$ is compared is computed in block 10 on the basis of filtered acceleration signal $a_{yfilter}$. The threshold is then labeled as $\Delta v_{yth}$ and the threshold value comparison is performed in block 11. If the differential acceleration signal exceeds threshold $\Delta v_{yth}$, a triggering event is recognized, and restraining means are deployed as a function of the classification of the occupants. If the differential speed signal is less than the threshold, no triggering situation exists. This algorithm is then executed on an ongoing basis as a function of acceleration signals 2 through 5. The direction of the side impact is recognized, for example, in control unit 6 via its own acceleration sensors for the y direction. The plus or minus sign of the integrated y acceleration signal is used in particular for determining the direction. This makes it possible to deploy restraining means according to the situation.

Filtering is performed in two stages. First the slope of the acceleration signal is limited to eliminate hard driving maneuvers that exhibit acceleration signals having very high slopes as misuse. Second, a zero-frequency component is subtracted from the acceleration differential signal to prevent the threshold from becoming excessively high. The zero-frequency component and the slope limitation are performed as a function of time.

The algorithm to be used is freely selectable and does not depend on the method. Opposite sensors 2 through 5 and 3 through 4 form pairs which are combined. Each pair is then evaluated by an algorithm of its own according to FIG. 1.

This makes it possible to perform the plausibility test in adjacent pairs or in control unit 6.

What is claimed is:

1. A method for performing a side impact sensing in a vehicle, comprising:

providing at least one acceleration sensor on each side of the vehicle for the side impact sensing and to produce a plurality of acceleration signals;

generating by subtraction a differential acceleration signal from the acceleration signals;

one of integrating and adding up the differential acceleration signal to yield a differential speed signal;

in order to perform the side impact sensing, comparing the differential speed signal to a threshold;

forming the threshold as a function of the differential acceleration signal; and filtering the differential acceleration signal prior to forming the threshold.

2. A method of using a device for side impact sensing as recited in claim 1, wherein:

the at least one acceleration sensor includes a plurality of acceleration sensors that are connectable to a control unit for a restraining device, the control unit including another plurality of acceleration sensors for plausibility testing and the control unit computing an algorithm for the side impact sensing.

* * * * *